(12) United States Patent
Steigerwald et al.

(10) Patent No.: US 7,327,113 B2
(45) Date of Patent: Feb. 5, 2008

(54) ELECTRIC STARTER GENERATOR SYSTEM EMPLOYING BIDIRECTIONAL BUCK-BOOST POWER CONVERTERS, AND METHODS THEREFOR

(75) Inventors: Robert Louis Steigerwald, Burnt Hills, NY (US); Luis Jose Garces, Niskayuna, NY (US); Matthew Christopher Bringman, Cincinnati, OH (US)

(73) Assignee: General Electric Company, Niskayuna, NY (US)

( * ) Notice: Subject to any disclaimer, the term of this patent is extended or adjusted under 35 U.S.C. 154(b) by 173 days.

(21) Appl. No.: 10/990,193

(22) Filed: Nov. 15, 2004

(65) Prior Publication Data

US 2006/0103341 A1 May 18, 2006

(51) Int. Cl.
*G05B 11/28* (2006.01)
(52) U.S. Cl. .................. 318/599; 318/811; 318/727; 318/801; 363/17; 363/21.1; 290/40 C; 290/40 B
(58) Field of Classification Search ............. 318/599, 318/811, 727, 801; 363/17, 21.1, 22, 26; 290/40 C, 4 C, 40 B
See application file for complete search history.

(56) References Cited

U.S. PATENT DOCUMENTS

| | | |
|---|---|---|
| 3,902,073 A | 8/1975 | LaFuze |
| 3,908,161 A | 9/1975 | Messenger |
| 4,093,869 A | 6/1978 | Hoffmann et al. |
| 4,219,739 A | 8/1980 | Greenwell |
| 4,330,743 A | 5/1982 | Glennon |
| 4,551,632 A | 11/1985 | Jourdan et al. |
| 4,743,777 A | 5/1988 | Shilling et al. |
| 4,743,812 A * | 5/1988 | Dishner ................. 318/14 |
| 4,786,852 A | 11/1988 | Cook |
| 4,841,216 A | 6/1989 | Okada et al. |
| 4,939,441 A | 7/1990 | Dhyanchand |
| 4,942,493 A | 7/1990 | Rozman et al. |
| 4,992,721 A | 2/1991 | Latos |
| 5,068,590 A | 11/1991 | Glennon et al. |
| 5,097,195 A | 3/1992 | Raad et al. |
| 5,179,508 A * | 1/1993 | Lange et al. ............ 363/16 |
| 5,430,362 A | 7/1995 | Carr et al. |
| 5,444,349 A | 8/1995 | Rozman et al. |
| 5,488,286 A | 1/1996 | Rozman et al. |
| 5,493,200 A | 2/1996 | Rozman et al. |
| 5,493,201 A | 2/1996 | Baker |
| 5,495,162 A | 2/1996 | Rozman et al. |

(Continued)

OTHER PUBLICATIONS

M. H. Kheraluwala et al, "Performance Characterization of a High-Power dual Active Bridge dc-to-dc Converter", IEEE Transactions on Industry Applications, vol. 28, No. 6, Nov./Dec. 1992, pp. 1294-1301.

*Primary Examiner*—Rina Duda
(74) *Attorney, Agent, or Firm*—Penny A. Clarke; Patrick K. Patnode

(57) ABSTRACT

A bidirectional buck-boost power converter 13 including a pair of inverter modules 14, 15 disposed at an output of a machine, and an inductor $L_o$ connected between the pair of inverter modules 14, 15. A method for controlling a voltage output of a machine starter generator having an inverter rectifier and bidirectional buck-boost converter, includes outputting a dc voltage controlled by bidirectional buck-boost pulse width modulation (PWM) switching control, when the starter generator is in a generator mode.

18 Claims, 2 Drawing Sheets

U.S. PATENT DOCUMENTS

| | | |
|---|---|---|
| 5,495,163 A | 2/1996 | Rozman et al. |
| 5,550,456 A | 8/1996 | Shekhawat et al. |
| 5,581,168 A | 12/1996 | Rozman et al. |
| 5,594,322 A | 1/1997 | Rozman et al. |
| 5,899,411 A | 5/1999 | Latos et al. |
| 6,153,942 A | 11/2000 | Roseman et al. |
| 6,281,595 B1 * | 8/2001 | Sinha et al. .............. 290/40 A |
| 6,487,098 B2 * | 11/2002 | Malik et al. .................. 363/89 |
| 2001/0009363 A1 | 7/2001 | Rice et al. |
| 2003/0011259 A1 | 1/2003 | Johnsen |

* cited by examiner

ELECTRIC STARTER GENERATOR SYSTEM EMPLOYING BIDIRECTIONAL BUCK-BOOST POWER CONVERTERS, AND METHODS THEREFOR

BACKGROUND OF THE INVENTION

This invention relates to controlling the output of AC machines, and more particularly, to a buck-boost power converter for controlling the output of an electric starter generator.

High speed AC machines optimized for small size can have high AC impedances. During steady state operation when generating power to a DC load through a rectifier, the high AC impedances are not a major problem. However, when the loads are suddenly applied or removed, the high AC impedances are a problem. This is the case, because the changes in the DC voltages supplied from the rectifier to the loads, as a result of the application or removal of the loads, are unacceptably large.

One manner in which this problem has been addressed is to use a large capacitor bank at the output of the rectifier to supply or absorb the transient energy. However, the large capacitor bank adds much size and weight, which is problematic in a system in which size and weight must be limited as much as possible. Thus, there remains a need for improvement.

SUMMARY OF THE INVENTION

An exemplary embodiment of the present invention includes a bidirectional buck-boost power converter including a pair of half bridge inverter modules disposed at an output of a machine; and an inductor connected between the pair of half bridge inverter modules.

In another exemplary embodiment of the present invention, a bidirectional buck-boost power converter includes a pair of full-bridge inverter modules disposed at an output of a machine; and a transformer connected between the pair of full-bridge inverter modules.

In an additional exemplary embodiment of the present invention, an electric starter generator (ESG) system is configured to supply mechanical power to an aircraft engine or turbine during start up operation and configured to transform mechanical power from the turbine to electrical power during generator operation. The ESG system includes a synchronous starter generator mechanically coupled to the main load and configured to supply an alternating current (AC) voltage; an inverter/rectifier electrically connected to the synchronous starter generator and configured to convert the AC voltage to a DC voltage; and a bidirectional buck-boost power converter configured to perform each of a plurality of operations: step up the output voltage during transient operations, step down the output voltage during transient operations, step up the output voltage during steady state operations, and step down the output voltage during steady state operations.

In an embodiment of a method of the present invention, a method for controlling a voltage output of an AC machine starter generator having an inverter rectifier and bi-directional buck-boost converter, includes outputting a DC voltage controlled by bidirectional buck-boost pulse width modulation (PWM) switching control, when the starter generator is in a generator mode.

BRIEF DESCRIPTION OF THE DRAWINGS

The advantages, nature and various additional features of the invention will appear more fully upon consideration of the illustrative embodiment of the invention which is schematically set forth in the figures, in which.

DETAILED DESCRIPTION OF THE INVENTION

The present invention will be explained in further detail by making reference to the accompanying drawings, which do not limit the scope of the invention in any way.

In an embodiment of the invention, two bi-directional buck-boost converters are configured at the output of an AC machine/inverter/rectifier system to allow controlled power flow in either direction, for starting or generating, while enabling fast transient response for sudden load changes. Since the voltage can be bucked or boosted in either direction, the output voltage can be maintained during a sudden load application or load removal, through control of the buck-boost converters.

Figure 1:
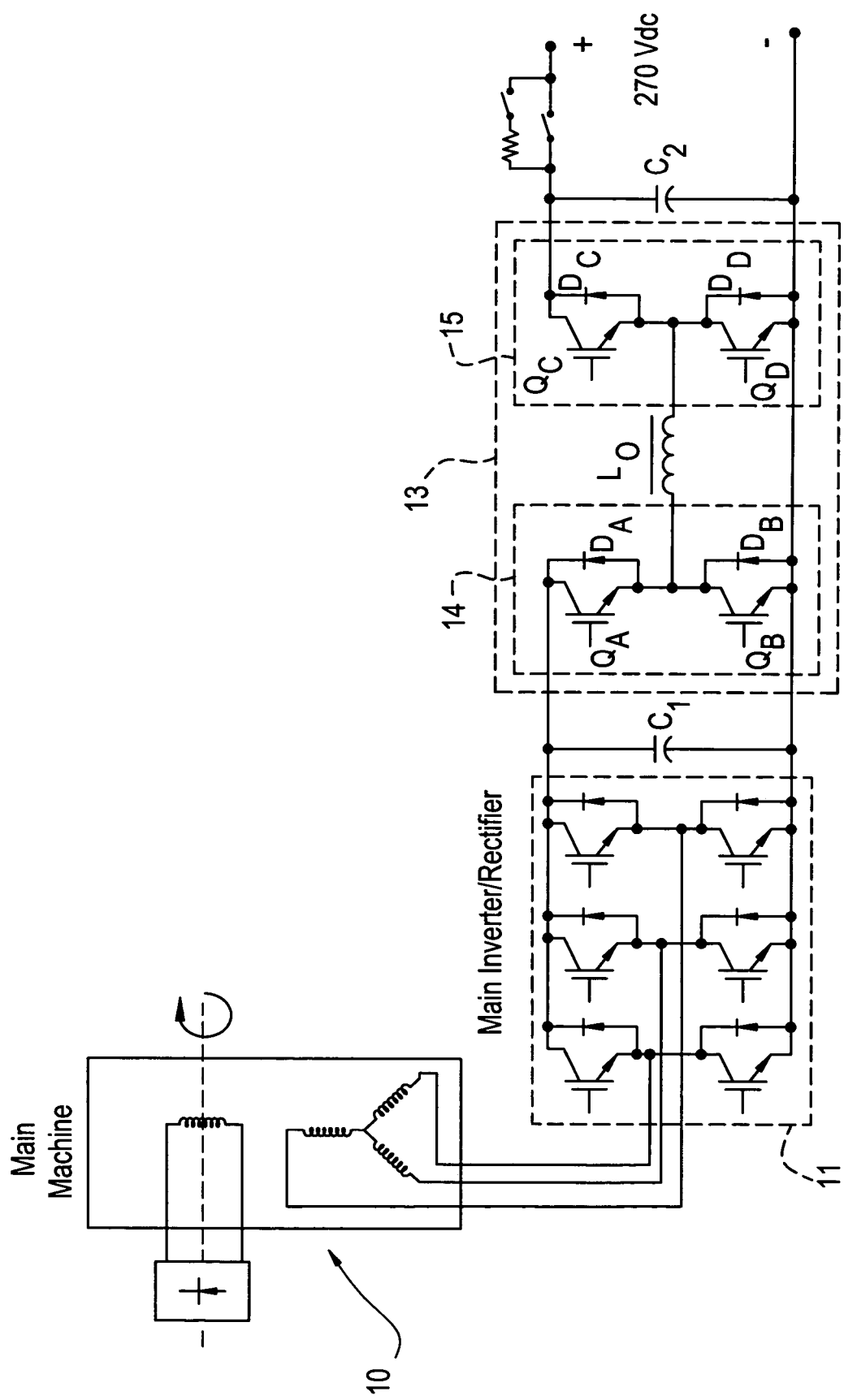
FIG. 1 is a diagrammatical representation of a buck-boost power converter according to an embodiment of the present invention.

A bidirectional buck-boost power converter embodiment is described with reference to FIG. 1. Although adaptable to both DC and AC machines, the exemplary bidirectional buck-boost power converter circuit 13 discussed with reference to FIG. 1 is configured for an AC machine. FIG. 1 illustrates an AC machine 10 having a 3-phase inverter/rectifier 11 at its output. Across the output of the inverter/rectifier 11 are DC link filter capacitors $C_1$ and across the output dc bus is capacitor $C_2$. Between the capacitors $C_1$ and $C_2$ is the buck-boost converter circuit 13, which includes two half bridge inverter modules 14 and 15 and an inductor $L_0$. Included in the half bridge inverter module 14 are transistors $Q_A$ and $Q_B$ and their associated inverse parallel diodes $D_A$ and $D_B$. The half bridge inverter module 15 includes transistors $Q_C$ and $Q_D$ and their associated inverse parallel diodes $D_C$ and $D_D$.

The input to the buck-boost converter circuit 13 is supplied by the inverter/rectifier 11, which converts the output power of an AC machine 10. Shown in FIG. 1 is a wound field synchronous machine, but many other types of AC machines, e.g., permanent magnet or induction, may be used also.

The table shown below illustrates which devices in the buck-boost converter circuit 13 are operating, and in which modes, during operation of the system assuming a wound field machine using field control to regulate the dc output in steady state (shown as 270 Vdc in FIG. 1).

TABLE

| Mode | $Q_A$ | $Q_B$ | $Q_C$ | $Q_D$ | $D_A$ | $D_B$ | $D_C$ | $D_D$ | Operation |
| --- | --- | --- | --- | --- | --- | --- | --- | --- | --- |
| Generating | Conducting | | | | | | Conducting | | Rectifier output conducted to load by $Q_A$ and $D_C$ |

TABLE-continued

| Mode | $Q_A$ | $Q_B$ | $Q_C$ | $Q_D$ | $D_A$ | $D_B$ | $D_C$ | $D_D$ | Operation |
|---|---|---|---|---|---|---|---|---|---|
| Load Application | Conducting | | | Chopping | | | Switching | | Main rectifier output is boosted |
| Load Rejection | Chopping | | | | | Switching | Conducting | | Main rectifier output is bucked |
| Starting | | | Chopping | | Conducting | | | Switching | Main inverter is run six step and 250 VDC is bucked |

The operation of the buck-boost converter circuit 13 shown in FIG. 1 will now be discussed assuming a wound-field synchronous machine employing field control for steady-state output voltage regulation, as described in the Table. In the Table, "conducting" refers to a device being full on, "chopping" refers to a device actively being turned on or off, and "switching" refers to the diodes operating in switching mode. According to an embodiment of the present invention, power can be processed in either direction, i.e., starting or generating, and the voltage can be bucked (or reduced) or boosted in either direction. For example, an electric starter generator is configured to start an aircraft engine in a starting mode and to supply power to auxiliary systems during steady-state operations (generating mode). For the exemplary electric starter generator, power is supplied in a first direction to the turbine (e.g., aircraft engine) in a starting operation and is supplied in the reverse direction to the auxiliary systems in the generating mode. Beneficially, the bidirectional buck-boost power converter 13 is configured to buck (step down) and boost (step up) the voltage supplied by the electric starter generator in both directions (to the turbine during starting operations and to the auxiliary systems during generator operations).

During the generating mode, transistor $Q_A$ and diode $D_C$ are conducting and provide the rectifier output to a load at the output of the buck-boost converter circuit. During the generating mode, the output voltage is regulated by controlling the dc field of the synchronous machine. During the load application mode, transistor $Q_A$ is conducting, transistor $Q_D$ is chopping, diode $D_C$ is switching, and the main rectifier output is boosted in order to maintain the output dc voltage within acceptable limits during the transient (i.e., output voltage undershoot is limited). During the load rejection mode, transistor $Q_A$ is chopping, diode $D_B$ is switching, diode $D_C$ is conducting, and the main rectifier output is bucked again to maintain the output dc voltage within acceptable limits during the transient (i.e., output voltage overshoot is limited). During the starting mode, transistor $Q_C$ is chopping, diode $D_A$ is conducting, diode $D_D$ is switching, the main inverter is operated in six-step mode and the 270 VDC is bucked.

Since the voltage can be bucked or boosted in either direction, the buck-boost converters can maintain the output voltage during the application or removal of a load.

Furthermore, since the voltage excursions (overshoots and undershoots) are controlled by the buck-boost converter circuit, the size of the DC link filter capacitors can be reduced, as compared to the approach described above for the related art. Furthermore, in the related art system, capacitors are used for energy storage, but in the embodiment of the present invention the capacitors C1 and C2 are essentially high frequency bypass capacitors used to eliminate ripple in the output.

The main inverter rectifier converter circuit can be operated in "six-step" mode and the bi-directional buck-boost circuit in pulse width modulation (PWM) mode to deliver a DC link voltage proportional to the machine frequency during starting, i.e., driving the AC machine as a motor, which greatly reduces inverter switching losses, compared to sinusoidal PWM operation of the inverter with full DC bus voltage needed in conventional systems. Operating the buck-boost converter circuit in PWM mode to produce a DC link voltage during starting results in lower current ripple and lower power losses.

If the DC link bus is controlled to be variable in amplitude, the converter connected to the machine could be also operated in a "Pulse Amplitude Mode" in order to reduce the switching losses. For this, the converter is switched as a standard PWM converter or with a constant duty cycle, while the DC bus is varied proportional to the machine speed. The bandwidth of the current regulator will depend on how fast the buck-boost converter is able to vary the voltage. Also, for the case of an induction generator, the inverter can be operated in "six-step" mode (square-wave) with the current regulation modifying the output voltage of the buck-boost converter circuit as described before.

For a wound-field synchronous machine employing field control to regulate the output, PWM chopping action of the buck-boost circuits is not needed to control the output. In other words, the transistors $Q_A$ is gated full on and diode $D_C$ conducts dc current. Thus, switching losses are reduced during steady state operation.

Unlike the system described above in reference to the related art, no power resistor is needed for dissipating power at the output of the AC machine during load rejection, because of the use of the buck-boost converter circuit. By controlling the voltage during load application and load removal, the buck-boost converter circuit is able to maintain the output voltage of the system, thereby eliminating the need for the power resistor.

An advantage of the above-described embodiment of the invention over conventional systems is better fault handling capabilities, because no large capacitor is needed if there is a short circuit at the output, and potentially destructive currents that would be supplied by a large output capacitor bank are avoided.

Figure 2:
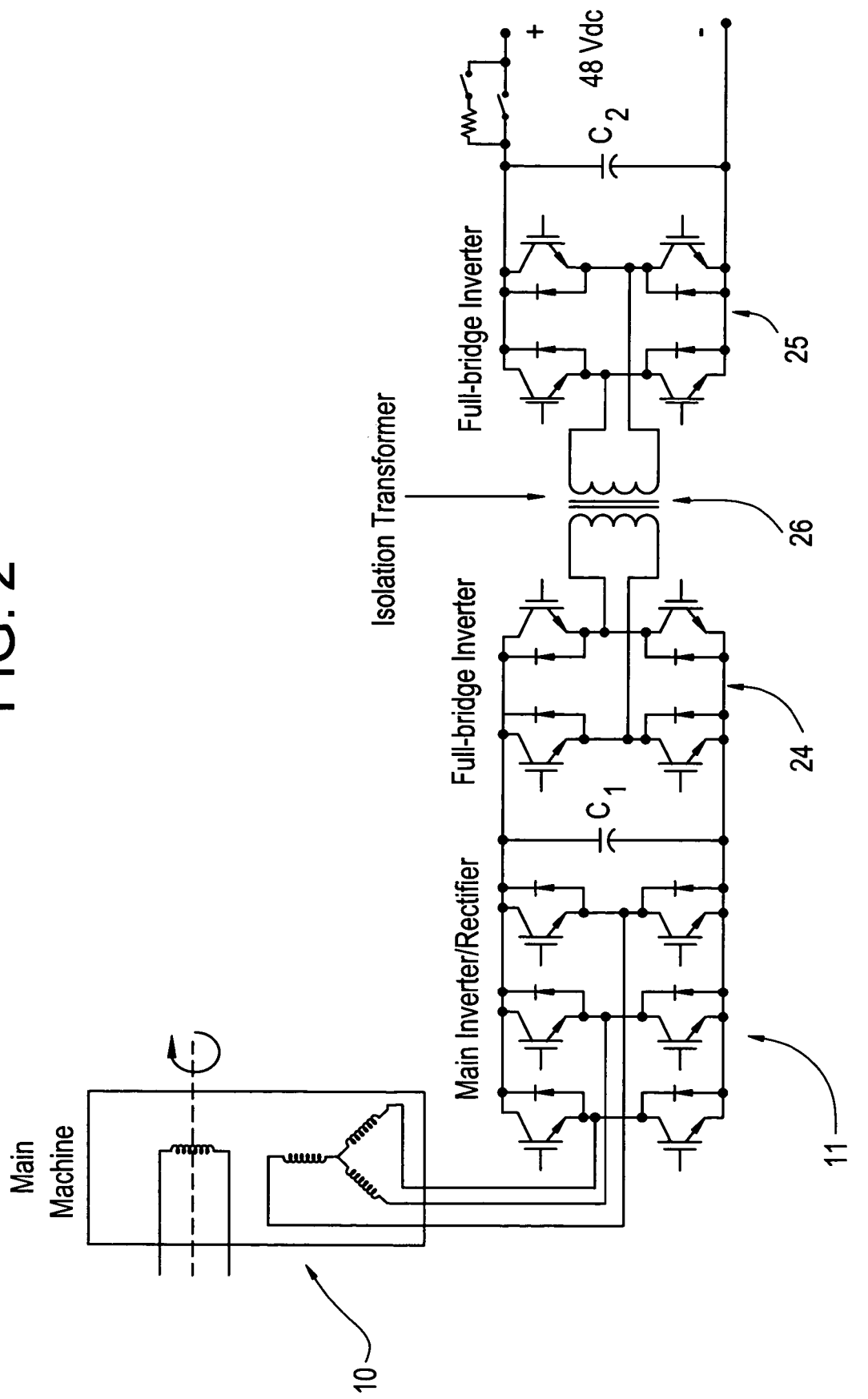
FIG. 2 is a diagrammatical representation of a buck-boost power converter according to another embodiment of the present invention.

The "buck-boost" function can also be implemented using transformer isolated circuits that are capable of processing power in either direction. One such embodiment is shown in FIG. 2. In this figure, two full-bridge inverters 24, 25 are shown with an isolation transformer 26 between the two inverters. The power can be processed in either direction by driving each full bridge in full square wave mode (i.e., opposite transistors each conduct for approximately 50% of the time) producing a square wave at the transformer. The voltage transformation and the direction of power flow is then controlled by phase shifting one bridge relative to another. This type of operation can also result in "soft switching" of the transistors that gives low switching stresses and losses as described in "Performance characterization of a high-power dual active bridge DC-to-DC converter," by Kheraluwala, M. N.; Gascoigne, R. W.; Divan, D. M.; Baumann, E. D.; Industry Applications, IEEE Transactions on, Volume: 28, Issue: 6, November- December 1992, Pages: 1294-1301. By employing a transformer as illustrated in FIG. 2, large voltage transformation ratios are more easily handled. For example, if the machine voltage is high and the dc bus voltage is low (such as the 48 volts DC illustrated in FIG. 2) the transformer turns ratio can be adjusted to give most of this voltage transformation. Also, more machine and output voltage grounding options are available due to the transformer's galvanic isolation. Also, it is noted that half-bridge inverters can be used instead of the full bridge inverters illustrated in FIG. 2.

While the invention has been described in terms of specific embodiments, those skilled in the art will recognize that the invention can be practiced with modification within the spirit and scope of the claims. Namely, although the present invention has been discussed in the context of electric starter generator applications, it is contemplated that the present invention can be employed in all applications which control the output of an AC machine.

What is claimed is:

1. An electric starter generator (ESG) system configured to supply mechanical power to a turbine during a starting operation and configured to transform mechanical power from the turbine to electrical power during a generating operation, said ESG system comprising:
    a synchronous starter generator mechanically coupled to the turbine and configured to supply an alternating current (AC) voltage;
    an inverter/rectifier electrically connected to said synchronous starter generator and configured to convert the AC voltage to a DC voltage; and
    a bidirectional buck-boost power converter configured to perform each of a plurality of operations: step up the output voltage during transient operations, step down the output voltage during transient operations, step up the output voltage during steady state operations, and step down the output voltage during steady state operations, such that a DC bus voltage is maintained substantially constant during both steady state and transient operations solely via the bidirectional buck-boost power converter and one or more DC bus link filters.

2. The ESG system of claim 1, wherein said bidirectional buck-boost power converter comprises:
    a pair of half bridge inverter modules disposed at an output of said inverter/rectifier; and
    an inductor connected between said pair of half bridge inverter modules.

3. The ESG system of claim 1, wherein said inverter/rectifier is configured for operation in a six-step mode.

4. The ESG system of claim 3, wherein said inverter/rectifier is configured for operation in the six-step mode during a starting operation of the synchronous starter generator.

5. The ESG system of claim 1, wherein said inverter/rectifier is configured for operation in a pulse width modulation (PWM) mode.

6. The ESG system of claim 4, wherein said inverter/rectifiers is configured for operation in the PWM mode to deliver a DC link voltage proportional to a machine frequency of the synchronous starter generator during a starting operation.

7. The ESG system of claim 1, wherein said bidirectional buck-boost power converter is configured to maintain an output voltage within a tolerance of at least +22% and −26% during the transient operation.

8. The ESG system of claim 1, wherein said bidirectional buck-boost power converter comprises:
    a pair of full-bridge inverter modules disposed at an output of said inverter/rectifier; and
    a transformer connected between said pair of full-bridge inverter modules.

9. A method for controlling a voltage output of a wound field synchronous starter generator having an inverter/rectifier and a bi-directional buck-boost converter, said method comprising:
    outputting a DC voltage based upon a field current when said wound field synchronous starter generator is in a generator mode; and
    performing a buck-boost operation of the buck-boost converter in a mode selected from a buck-boost converter conduction mode, a buck-boost converter load application mode, a buck-boost converter load rejection mode and a buck-boost converter starting mode such that a DC bus voltage is maintained substantially constant solely via the bi-directional buck-boost converter and one or more DC bus link filters during the conduction mode, the load application mode, the load rejection mode and the starting mode.

10. A method for controlling a voltage output of an ac starter generator having an inverter/rectifier and bi-directional buck-boost converter, said method comprising;
    outputting a dc voltage controlled by a bi-directional buck-boost pulse width modulation (PWM) switching control, when said ac starter generator is in a generator mode, such that a dc bus voltage is maintained substantially constant solely via the bi-directional buck-boost converter and one or more DC bus link filters during a sudden load application or removal.

11. The method of claim 10, wherein only a plurality of inverter/rectifier diodes conduct a current to an output of said ac starter generator.

12. The method of claim 10, wherein said inverter/rectifier performs PWM switching to perform at least one of drawing sinusoidal current waves from said ac starter generator and boosting said dc voltage to said bi-directional buck-boost converter.

13. The method of claim 10, further comprising:
    controlling said voltage output and an output current based upon inverter PWM control, when said an starter generator is in a start mode.

14. The method of claim 13, wherein only a plurality of inverter/rectifier diodes conduct said current to an output of said an starter generator.

15. The method of claim 13, wherein said bi-directional buck-boost converter performs PWM switching to control a current from a DC bus to said inverter/rectifier.

16. The method of claim 10, further comprising:
    operating said inverter/rectifier in six-step mode, when said ac starter generator is in a start mode.

17. The method of claim 16, further comprising:
    controlling said output voltage by PWM switching of said bi-directional buck-boost converter.

18. The method of claim 16, wherein said output voltage is proportional to a machine speed of said ac starter generator.

* * * * *

UNITED STATES PATENT AND TRADEMARK OFFICE
CERTIFICATE OF CORRECTION

| | | |
|---|---|---|
| PATENT NO. | : 7,327,113 B2 | Page 1 of 1 |
| APPLICATION NO. | : 10/990193 | |
| DATED | : February 5, 2008 | |
| INVENTOR(S) | : Steigerwald et al. | |

It is certified that error appears in the above-identified patent and that said Letters Patent is hereby corrected as shown below:

In Column 6, Line 49, in Claim 13, after "said" delete "an" and insert -- ac --, therefor.

In Column 6, Line 53, in Claim 14, after "said" delete "an" and insert -- ac --, therefor.

Signed and Sealed this

Nineteenth Day of May, 2009

JOHN DOLL
*Acting Director of the United States Patent and Trademark Office*